Figure 1:
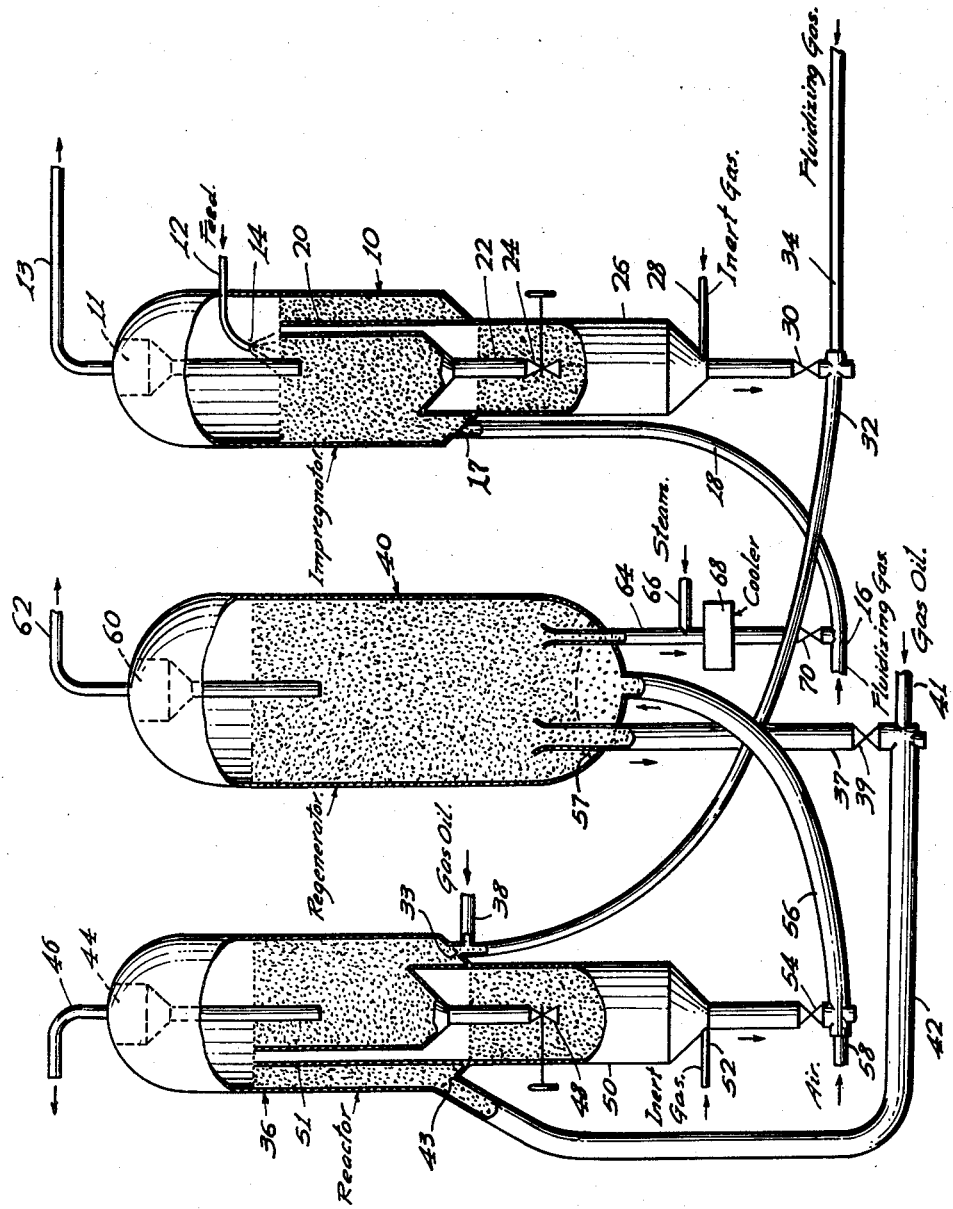

March 29, 1960  C. W. MONTGOMERY ET AL  2,930,748
FLUID CATALYTIC PROCESS WITH PRELIMINARY TREATMENT OF THE FEED
Filed April 4, 1952  2 Sheets-Sheet 1

INVENTORS.
Charles W. Montgomery And
BY Joseph B. McKinley.
ATTORNEY:-

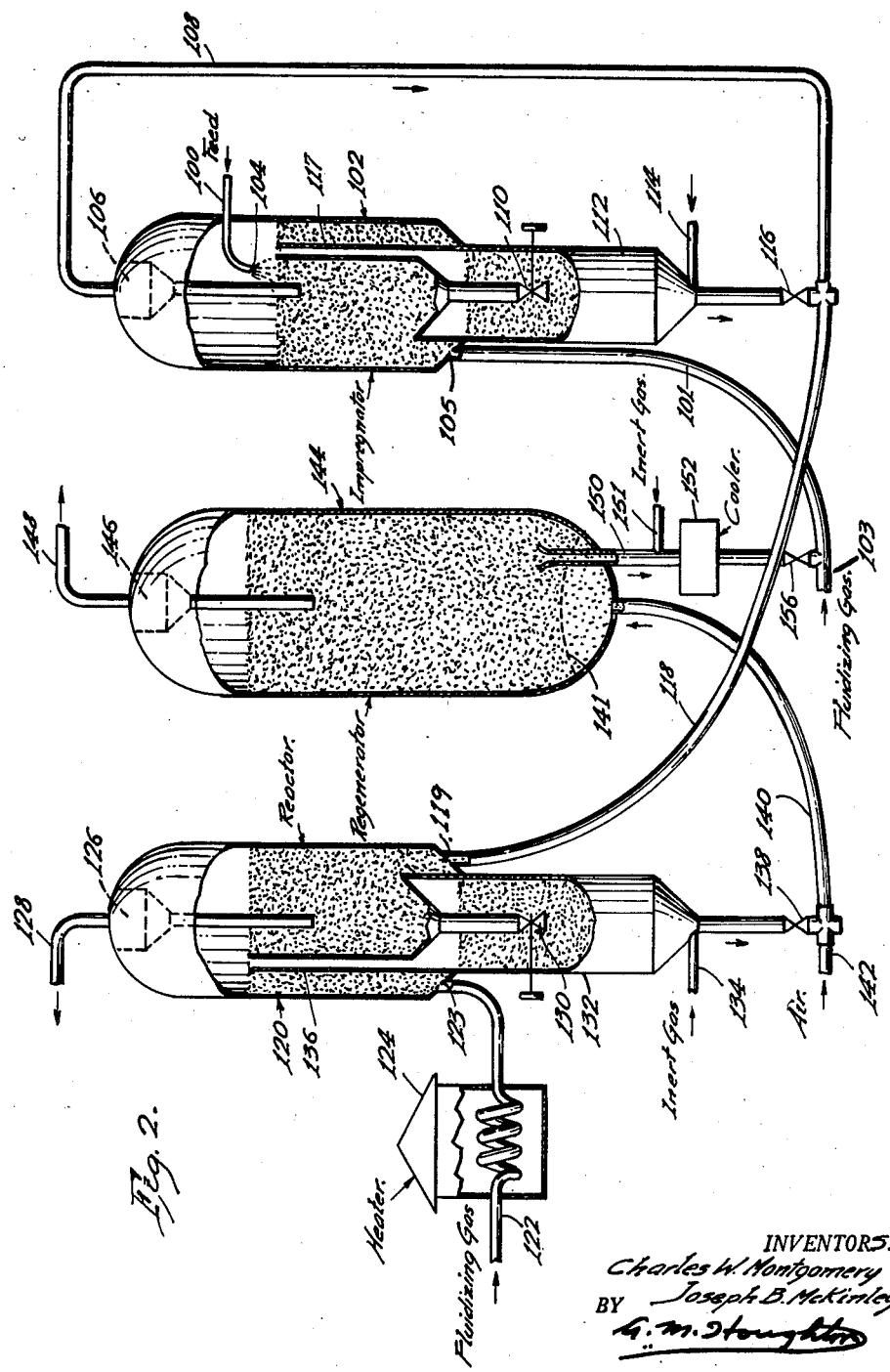

United States Patent Office 2,930,748
Patented Mar. 29, 1960

2,930,748

FLUID CATALYTIC PROCESS WITH PRELIMINARY TREATMENT OF THE FEED

Charles W. Montgomery, Oakmont, and Joseph B. McKinley, Pittsburgh, Pa., assignors to Gulf Research & Development Company, Pittsburgh, Pa., a corporation of Delaware Application April 4, 1952, Serial No. 280,476

5 Claims. (Cl. 208—91)

This invention relates to a fluid catalytic process.

It has proved to be difficult to apply fluid catalytic procedure to feeds containing high-boiling liquid hydrocarbon constituents, and particularly to residual oils. Thus, these high-boiling constituents yield excessive amounts of undesirable gaseous hydrocarbon by-products and cokey carbonaceous contaminants when treated by conventional fluid procedure. These by-products and contaminants frequently arise from deleterious thermal conversion reactions which occur when such feeds are heated to reaction temperature prior to contact with conversion catalyst. For example, when feeds containing an appreciable quantity of high-boiling constituents such as petroleum crude distillation bottoms are catalytically cracked by conventional fluid cracking procedure, the distillation bottoms are thermally cracked and coke and coke precursors are formed when the bottoms are heated to a catalytic conversion temperature of 750° to 1000° F. in the preheater and conduits prior to contact with the cracking catalyst. Moreover, even in fluid cracking systems in which no preheater for the feed is used, but where the feed is heated by contact with hot cracking catalyst in a conduit leading to the cracking reactor, excessive thermal cracking of the high-boiling bottoms is encountered in the conduit. This is due to the cracking catalyst's being in the so-called "dispersed phase" in the conduit and not in the so-called "dense phase," the "dense phase" being the phase in which the catalyst occurs in the reactor. As a result, the ratio of catalyst to feed in the conduit is much lower than in the reactor and an undue amount of thermal conversion is effected when the feed contacts the hot catalyst and the walls of the conduit. The lower-boiling constituents of the feed do not undergo this deleterious thermal cracking to a comparable extent. Accordingly, the prior art has favored relatively low-boiling charges such as gas oils for catalytic cracking feed. This has resulted in an overabundance of high-boiling materials and a resultant low economic return therefor.

In the case of the fluid hydrocracking of high-boiling liquid hydrocarbon feeds, comparable difficulties are encountered. Thus, in these types of processes, the high-boiling feed constituents produce an increase in coke deposition over and beyond that encountered when lower-boiling feeds are employed, and moreover, even under elevated hydrocracking temperatures and pressures such as about 750° to 950° F. and about 250 to 2000 pounds per square inch or more, these high-boiling feed constituents are only partially hydrocracked to valuable low-boiling products such as gasoline.

The present invention relates to a fluid catalytic process for treating hydrocarbon liquids in which disadvantages such as the foregoing are at least substantially overcome. This process comprises impregnating a liquid hydrocarbon feed, such as a petroleum hydrocarbon or coal tar liquid hydrocarbon feed, upon fluidized catalyst particles at a low temperature so that substantial vaporization of the feed does not occur. By no "substantial vaporization" we mean a vaporization of the order of less than about 25 weight percent of the feed, and preferably of the order of less than 15 weight percent. Moreover, in the case of a catalytic cracking process, the impregnation temperature must be such that it is below the temperature at which substantial cracking of the hydrocarbon feed normally occurs. In this manner not only is there a more uniform degree of contact established between the feed and the catalyst, resulting in a deeper conversion of the feed in the subsequent conversion, but also the deleterious cracking which would otherwise occur at or before the initial contact of the feed with the catalyst is prevented, since the feed is not heated to conversion temperature prior to being introduced into the reactor. Thus it is not necessary to preheat the feed to conversion temperature, nor to contact the feed with hot catalyst outside of the fluid reactor. The impregnated liquid feed upon the catalyst is catalytically converted into valuable reaction products by heating the impregnated fluidized catalyst particles to an elevated reaction temperature. This may be accomplished in the same vessel employed for the impregnation, but preferably is accomplished by transferring the impregnated fluidized catalyst to a reaction zone of higher temperature. It is advantageous in many cases, particularly with catalytic cracking, to mix the impregnated catalyst particles with a lower boiling fraction or fractions at or before the heating of the impregnated catalyst particles to the elevated reaction temperature, as by proceeding in this way the lower boiling fraction or fractions are subjected to catalytic conversion conditions while the conversion of the impregnated feed is not adversely affected, but may be improved.

In the accompanying drawings, Figure 1 is a diagrammatic flow sheet of an endothermic reaction system such as a catalytic cracking system, employing the process of our invention.

Figure 2 is a diagrammatic flow sheet of an exothermic reaction system such as a hydrocracking system, employing the process of our invention.

The system disclosed in Figure 1 is especially applicable for endothermic fluid catalytic reactions such as catalytic cracking. For the purpose of illustrating the process of our invention, a Kuwait crude is employed as the source of the hydrocarbon feed containing high-boiling liquid constituents. Fractional distillation of this crude yields the following fractions:

| Fraction Number | Boiling Range, °F. | Amount of Debutanized Crude Volume, Percent |
|---|---|---|
| 1 | to 300 | 17.4 |
| 2 | 300 to 350 | 4.8 |
| 3 | 350 to 410 | 4.9 |
| 4 | 410 to 520 | 10.1 |
| 5 | 520 to 670 | 14.2 |
| 6 | 670 to 775 | 7.5 |
| 7 | 775 to 850 | 6.4 |
| 8 | above 850 | 34.7 |
|  |  | 100.0 |

It is to be understood, of course, that while we are employing Kuwait feed stock in the instant example, our process is equally applicable to the catalytic cracking of other feed stocks having a significant weight percentage of residual distillation bottoms such as Baxterville, Mississippi, crude; East Texas crude; Venezuela crude; and non-petroleum hydrocarbon feed stocks such as those derived from coal, oil shale, etc.

The residual bottoms from the fractional distillation are charged into fluid impregnator 10 through line 12. The bottoms have been preheated to substantially the impregnation temperature within fluid impregnator 10, namely about 500° F. From line 12 the liquid is sprayed from spray-nozzle 14, onto a bed of fluidized cracking catalyst in fluid impregnator 10. In the instant example, the cracking catalyst comprises synthetic silica-alumina microspheres containing about 86 percent by weight of silica and 14 percent of alumina. However, any of the conventional cracking catalysts may be used in the process of our invention such as silica-magnesia, activated montmorillonite clays, activated halloysite, etc. We claim no novelty in the specific catalyst employed in the process of our invention and, accordingly, any conventional cracking catalyst may be employed therein. The fluidized bed of cracking catalyst in fluid impregnator 10 is maintained fluidized by the addition of fluidizing gas, comprising a low-boiling naphtha hydrocarbon fraction or inert gas, from line 16 through line 18 and grid 17 into fluid impregnator 10. This fluidizing gas continuously conveys regenerated catalyst from valve 70 through line 18 and grid 17 to fluid impregnator 10.

The level of the fluid catalyst within fluid impregnator 10 is maintained constant by overflow pipe 20. Spray-nozzle 14 is located at a height of about one-half foot above the level of the fluid catalyst bed in fluid impregnator 10. The residual distillation bottoms which have been preheated (by means not shown) to impregnation temperature are discharged from spray-nozzle 14 in the form of droplets within the size range of about $1/32$ inch to $1/8$ inch, preferably $1/16$ to $1/8$ inch, into the bed of fluid catalyst. In general, the smaller the diameter of the feed droplet, the better will be the impregnation, since in this manner the formation of large clumps of wetted catalyst which drop to the bottom of the reactor or classify will be prevented. However, the drop diameter should be sufficiently large to prevent substantial vaporization of the feed or its free transport out of the impregnator with the fluidizing gas. Thus, in some cases, somewhat smaller size droplets than $1/32$ inch may successfully be employed without removal of the droplets from the impregnator through free transport. In addition, somewhat larger drop sizes than $1/8$ inch may sometimes be utilized without effecting bed classification.

The temperature within fluid impregnator 10 is below that at which substantial cracking and vaporization of the residual distillation bottoms can occur, and comprises, as heretofore indicated, a temperature of about 500° F. An impregnation temperature range of about 400° to 600° F. is advantageous for most residual distillation bottoms, although with certain refractory high-boiling fractions somewhat higher temperatures may be employed.

Fluidizing gas is removed from fluid impregnator 10 through cyclone separator 11 and line 13 and may be recycled to fluid impregnator 10 (by means not shown). Entrained fluid catalyst particles in the fluidizing gas are returned to the fluid bed by cyclone separator 11. The impregnated catalyst particles within fluid impregnator 10 are continuously passed through pipe 22 and valve 24 into collecting chamber 26. The impregnated catalyst within collecting chamber 26 is maintained as an expanded bed by the introduction of low-boiling naphtha or inert gas through line 28. The low-boiling naphtha or inert gas is removed from collecting chamber 26 through pipe 29. From collecting chamber 26, the impregnated catalyst is passed through valve 30 into line 32. Additional amounts of fluidizing gas comprising low-boiling hydrocarbons such as naphtha or gas oil are introduced into line 32 from line 34 and convey the impregnated catalyst through grid 33 to fluid reactor 36. Quantities of a vaporized intermediate-boiling fraction such as gas oil, are introduced into fluid reactor 36 from line 38 to augment the hydrocarbons introduced through line 34. The absolute quantity of the gas oil is usually in excess of 50 percent by weight of the high-boiling impregnated fed constituents. The gas oil may be derived from other sources than the crude from which the distillation bottoms are obtained.

Hot regenerated catalyst from fluid regenerator 40 and additional gas oil are also continuously introduced into fluid reactor 36 by means of line 42 and grid 43. This is accomplished by removing the hot regenerated catalyst from fluid regenerator 40 through line 37 and valve 39 into line 42. Within line 42 the hot catalyst is transferred to fluid reactor 36 by gas oil vapors which enter line 42 through line 41. This hot regenerated catalyst can be stripped of residual regenerating gases by conventional steam stripping means (not shown). The hot regenerated catalyst from regenerator 40 constitutes a major proportion of the catalyst introduced into fluid reactor 36. In this manner, the temperature within fluid reactor 36 is maintained at a cracking temperature level, namely, of the order of about 750° to 1000° F., preferably about 850° to 950° F., and a cracking pressure of the order of atmospheric pressure to about 100 pounds per syuare inch gauge. Under the aforesaid conditions, the impregnated hydrocarbons on the surface of the catalyst, the gas oil, and the naphtha are catalytically cracked to valuable low-boiling hydrocarbon products such as gasoline. Volatile catalytically cracked products are removed from catalytic reactor 36 through cyclone separator 44 and line 46. Entrained catalyst particles are returned to the catalyst bed within reactor 36 by means of cyclone separator 44.

Simultaneously with the catalytic cracking of the feed, the catalyst becomes deactivated and coated with cokey carbonaceous contaminants. Accordingly, it is necessary to continuously remove and regenerate catalyst from catalytic reactor 36. This is accomplished by continuously transferring catalyst through valve 48 into collecting chamber 50. Carbonaceously contaminated catalyst in collecting chamber 50 is maintained fluidized and stripped of any entrained hydrocarbon products by the addition of an inert fluidizing gas such as steam from line 52. This gas is withdrawn from collecting chamber 50 through pipe 51. The carbonaceously contaminated catalyst is removed from collecting chamber 50 through valve 54 into line 56. The catalyst within line 56 is transferred through grid 57 into fluid regenerator 40 by means of oxidative regenerating gas such as air or air plus flue gas introduced through line 58.

Within fluid regenerator 40 the carbonaceous contaminants are removed from the catalyst by oxidative regeneration. This is accomplished by burning away the carbonaceous contaminants with air or air plus flue gas at a temperature of about 1000° to 1200° F. It is to be understood that regeneration comprises a conventional operation and that other conditions known to the art can be employed. The gaseous products from the regeneration are removed from fluid regenerator 40 through cyclone separator 60 and line 62. Entrained catalyst in the gaseous products is returned by means of cyclone separator 60 to the bed of regenerating catalyst in fluid regenerator 40.

From fluid regenerator 40, a major proportion of the regenerated catalyst is returned to fluid reactor 36, as has heretofore been indicated, by means of line 42. The remainder of the regenerated catalyst that is continuously removed from fluid regenerator 40 is transferred to line 64. Any entrained air is stripped from the catalyst by an inert gas such as steam introduced into line 64 through line 66. The stripped regenerated catalyst is then passed into catalyst cooler 68. In catalyst cooler 68 the regenerated catalyst is cooled to substantially the impregnation temperature within fluid impregnator 10. The cooled regenerated catalyst then passes through valve 70 into line 18 and is recycled to fluid impregnator 10 as has heretofore been described.

While we have described the process of our invention as applied to the catalytic cracking of Kuwait bottoms which may be the bottoms after removing the gasoline, or gasoline and light gas oil, or gasoline and light and heavy gas oils, it is to be understood that our invention is equally applicable to the cracking of other high-boiling hydrocarbon feeds, and that the substitution or inclusion in our cracking process of processing means and conditions within the skill of one skilled in the art, is to be construed as included within the instant application. Thus, for example, many high-boiling petroleum fractions contain appreciable quantities of so-called "posioning" metals such as vanadium and/or nickel, and/or iron. These metals, when present, have a serious adverse effect upon the cracking catalyst and, accordingly, it is to be understood that when such metals are present to an appreciable extent in the feed they are to be removed prior to the introduction of said bottoms into fluid impregnator 10. The removal of these metals may be accomplished by any suitable method known to the art. Moreover, while we have indicated that the liquid hydrocarbon feed entering through line 12 should be preheated to substantially the impregnation temperature it is possible to vary this temperature provided the temperature within fluid impregnator 10 is below that at which substantial thermal cracking and vaporization of the feed occur. Thus, the impregnation temperature may be attained by a balance between the initial catalyst bed temperature, the fluidizing gas temperature, and the feed temperature. However, it is preferable to have both the feed and the catalyst bed at substantially the impregnation temperature.

The utilization of our invention for catalytic cracking permits a deep degree of cracking to be achieved upon feeds comprising high-boiling hydrocarbon constituents. In addition, there is a better contact of the charge with the catalyst particles resulting in a more efficient utilization of the entire body of catalyst particles. There is also a reduction in the yield of carbonaceous contaminants and difficultly condensable low-boiling hydrocarbon gases.

As has heretofore been indicated, the process of our invention is also applicable to exothermic reactions such as the hydrocracking of high-boiling liquid hydrocarbons. In particular, the process of our invention may be applied to the type of hydrocracking known as hydrodesulfurization, that is, a process whereby a high-boiling liquid hydrocarbon containing sulfur is hydrocracked and the sulfur removed. This can be accomplished with conventional hydrogenation catalysts under conventional hydrocracking conditions. The sulfur content of the feed may be removed by either absorption of the sulfur upon the catalyst in the form of metallic sulfide or by conversion of the sulfur content of the feed into hydrogen sulfide which is subsequently separated from the reaction products. Examples of hydrogenation catalysts which can be employed for hydrodesulfurization include the iron group metals or metal oxides such as nickel or nickel oxide; the group VI metal oxides and compounds such as tungsten oxide, molybdenum oxide, tungsten sulfide, cobalt molybdate, nickel tungstate, etc. These catalysts may or may not be supported upon a carrier such as alumina, silica-alumina, activated montmorillonite clays, kaolin clays, etc.

As illustrative of the application of the process of our invention to the hydrocracking of a feed comprising high-boiling liquid hydrocarbon constituents, reference should be had to accompanying Figure 2, which discloses a system for the hydrocracking of a high-boiling liquid hydrocarbon feed in accordance with the process of our invention. A high-boiling, difficultly vaporizable liquid petroleum hydrocarbon feed, e.g., a total crude, reduced crude, topped crude, or a high-boiling petroleum fraction such as residual distillation bottoms, is introduced into the system by means of line 100. The entire system is pressurized under controlled conditions to a pressure of from about 250 to 2000 pounds per square inch or more. From line 100 the feed, which has been preheated to impregnation temperature (by means not shown), enters fluid impregnator 102 and is sprayed through spray-nozzle 104 into the dilute phase above the dense phase fluid catalyst bed of hydrogenation catalyst in fluid impregnator 102. The bed of fluid catalyst is maintained fluidized by the addition of fluidizing gas, such as hydrogen-containing gas from line 103, which enters fluid impregnator 102 through line 101 and grid 105. This hydrogen-containing gas also serves to continuously convey regenerated catalyst into fluid impregnator 102 from valve 156 and line 101. In the instant example, in which a reduced West Texas crude comprising 20 to 50 volume percent of the crude is employed as the feed, preferred results are secured when the entire system is operated under a pressure of between about 500 and 1500 pounds per square inch gauge, preferably about 750 pounds per square inch gauge, and the hydrocracking catalyst comprises a 10 weight percent molybdenum trioxide on silica-alumina base (the weight percent of silica to alumina being about 1:9). With this type feed, a satisfactory impregnation temperature within fluid impregnator 102 is of the order of 400° to 600° F. The size of the droplets discharged from spray-nozzle 104 should be large enough to prevent substantial vaporization of the feed and also to prevent free transport of the droplets upwardly out of the fluid impregnator. However, the feed droplet size should be sufficiently small so as not to form large clumps of wetted catalyst which drop to the bottom of the impregnator and result in classification of the bed. In general, the smaller the diameter of the feed droplets, the better will be the impregnation. A feed droplet size of about 1/32 inch to 1/8 inch is usually adequate, with the size range of 1/8 inch to 1/16 inch being preferred.

Reduced West Texas crude under the conditions given above depending upon the degree to which it was reduced may yield a small quantity of vapor, namely of the order of a few weight percent of the feed. These vapors, as well as the fluidizing gas are removed from fluid impregnator 102 through cyclone separator 106 and line 108. Entrained catalyst is returned to the bed of fluid catalyst in impregnator 102 by means of cyclone separator 106.

Feed-impregnated catalyst is continuously withdrawn from fluid impregnator 102 through valve 110 and is collected in storage chamber 112 where it is maintained in a suspended state by hydrogen-containing gas entering from line 114. Pipe 117 serves to keep a constant level of catalyst within impregnator 102 and also provides for the exit of hydrogen-containing gas from storage chamber 112. The impregnated hydrogenation catalyst is removed from collecting chamber 112 through valve 116 and passes into line 118. In line 118, it is conveyed through grid 119 to reactor 120 by the mixture of hydrogen-containing gas and vaporized feed from line 108. This mixture can be heated in line 108 by means not shown.

A bed of dense phase hydrogenation catalyst is maintained in reactor 120 at a hydrocracking temperature of about 750° to 950° F., preferably 850° F. This temperature is maintained by the heat of the exothermic reaction and by the continuous addition of heated hydrogen-containing gas into reactor 120 from line 122, heater 124 and grid 123. The impregnated feed is cracked under hydrocracking conditions within reactor 120 to valuable low-boiling hydrocarbon products such as gasoline, and the vaporized hydrocracked products removed from the catalyst. Vapors, if any, from fluid impregnator 102 are also subjected to treatment in the reactor. The presence of small amounts of these vapors in reactor 120 sometimes improves the octane rating of the gasoline fraction of the hydrocracked product, and accordingly is desirable. The vaporized hydrocracked products and any unreacted hydrogen-containing gas are removed from reactor 120 through cyclone separator 126 and line 128. Entrained hydrogenation catalyst is returned to the dense phase fluid catalyst bed in reactor 120 by cyclone separator 126.

Simultaneously with the hydrocracking of the feed in reactor 120, the catalyst particles become carbonaceously contaminated. Accordingly, it is essential that the carbonaceously contaminated catalyst be regenerated and the carbonaceous contaminants removed. To accomplish this, catalyst is continuously removed from reactor 120 through valve 130 and into stripping chamber 132. In stripping chamber 132, the catalyst is stripped of any entrained hydrogen-containing gas and residual hydrocarbons by means of an inert gas from line 134. This inert stripping gas mixture passes upwardly through pipe 136 and thence out of reactor 120 through cyclone separator 126 and line 128.

The carbonaceously contaminated catalyst in stripping chamber 132 passes downwardly through valve 138 into line 140. The carbonaceously contaminated catalyst within line 140 is conveyed upwardly through grid 141 to regenerator 144 by means of regenerating gas such as air entering from line 142. Within regenerator 144 the carbonaceous contaminants are removed from the catalyst by combustion at an elevated temperature such as about 1000° to 1200° F. The flue gas from the oxidative regeneration leaves regenerator 144 through cyclone separator 146 which returns entrained regenerating catalyst to regenerator 144, and is then removed from the system through line 148. The regenerated catalyst passes downwardly from regenerator 144 into pipe 150 and is stripped of oxygen-containing gas by an inert gas which enters pipe 150 through line 151. The stripped regenerated catalyst then passes through catalyst cooler 152 and is cooled to substantially the impregnating temperature employed in fluid impregnator 102. From catalyst cooler 152, the regenerated catalyst passes through valve 156 into line 101. The regenerated catalyst is conveyed to fluid impregnator 102 by means of hydrogen-containing gas from line 103 and the process repeated as has been heretofore described. Proper control devices (not shown) are employed to prevent reverse flows through valves 138 and 156.

While the foregoing description of our process as applied to hydrocracking constitutes a preferred operating procedure, it is obvious that our process may be modified by one skilled in the art. It is to be understood that these modifications constitute a part of our invention and are to be considered as included within the appended claims. By way of example, regenerator 144 can be eliminated and the catalyst circulated between the impregnator and the reactor. After an interval during which the carbonaceous contaminants' level on the catalyst increases, the flow of feed and hydrogen-containing gas is stopped and the catalyst purged by an inert gas. The entire catalyst inventory of the system can then be removed from the system and regenerated, as by oxidative combustion, and the carbonaceous contaminants removed from the catalyst. Following the regeneration, the catalyst is again purged with inert gas, returned to the system, and the treatment of additional feed commenced.

Additional modifications of the process of our invention include conducting the entire process in one vessel. Thus, while we have disclosed a system in which the catalyst is impregnated with feed in one vessel, and the impregnated feed treated in another, the process can advantageously be conducted in one vessel. Thus, the catalyst can be impregnated with feed at a low temperature after which the flow of feed is stopped and the temperature of the fluid catalyst bed elevated to reaction temperature. Non-liquid reactants, such as hydrogen-containing gas in the case of hydrocracking, can be added to the fluid catalyst bed before or during its temperature elevation. It is to be noted, however, that the procedure heretofore described in which the impregnation and reaction are performed in separate vessels is to be preferred, inasmuch as it permits a continuous operation to be employed.

Furthermore, our process may be modified regarding the treatment of volatilized feed from the impregnator. While this volatilized feed in no case constitutes a substantial weight percent of the feed charged to the impregnator, in some cases as in the specific example for the hydrocracking embodiment heretofore described, it is advantageous to convey the volatilized feed to the reactor. However, in other cases, the volatilized feed can be condensed out and only the overhead hydrogen-containing gas conveyed to the reactor. It is of course obvious, as disclosed heretofore in the specific example relating to the cracking embodiment, that frequently the feed to the impregnator will be such that there will be no appreciable feed vaporization in the impregnator, and the means for conveying and/or condensing the vapors can, of course, be eliminated. Furthermore, means for conducting portions of the process cycle at different pressure levels can be employed, and the various stages of the process conducted at different pressures. While the diagrammatic flow sheets set forth in Figures 1 and 2 do not disclose the addition of make-up or fresh catalyst during the course of the process, it is to be understood that this may be accomplished by any one of a number of procedures obvious to one skilled in the art, such as by introducing the fresh catalyst into the conduit leading to the impregnator.

In addition, while we have shown the impregnation of the feed upon the dense phase fluidized catalyst bed in the fluid impregnator by means of a spray-nozzle located above the bed, in some cases it is desirable to impregnate the catalyst in other ways. Thus, for example, the feed can be impregnated onto the catalyst bed from nozzles located directly in the dense phase catalyst bed. A particularly advantageous form of nozzle for this purpose is a shrouded type nozzle in which the spray from the nozzle is surrounded by gas from the shroud, which gas prevents the spray from contacting the shroud, and also prevents the fluidized catalyst particles from contacting the nozzle. Furthermore, in some cases it may prove desirable to impregnate the catalyst bed through the simultaneous use of spray-nozzles located above the fluid catalyst bed and nozzles located directly in the dense phase fluid catalyst bed.

As has heretofore been indicated, the utilization of the process of our invention permits the facile treatment of feeds containing high-boiling liquid hydrocarbon constituents. Moreover, our process furnishes a deep degree of conversion for such feeds. Thus, in the case of the hydrocracking of a high-boiling feed, optimum hydrocracking of the heaviest components can be secured. Moreover, the formation of carbonaceous contaminants and undesirable gaseous by-products is appreciably retarded.

We claim:

1. A continuous process for the catalytic cracking of a high-boiling liquid petroleum fraction which comprises maintaining a fluidized bed of cracking catalyst at a temperature, about 400° to 600° F., below that at which substantial vaporization and cracking of said high-boiling fraction occurs, in a catalyst impregnation zone, impregnating said cracking catalyst at said temperature in said impregnation zone with said high-boiling liquid petroleum fraction while maintaining the catalyst in the fluidized state, withdrawing impregnated catalyst from said impregnation zone and combining therewith a vaporized gas oil fraction in an amount of more than 50 per cent by weight based on the weight of said impregnated high-boiling liquid fraction, transferring the combined mixture to a reaction zone, catalytically cracking under fluidizing conditions the combined hydrocarbons in said reaction zone at a temperature of about 850° to 950° F. and simultaneously contaminating the fluidized cracking catalyst in said reaction zone with carbonaceous contaminants, withdrawing catalytically cracked products from said reaction zone, withdrawing carbonaceously contaminated cracking catalyst from said reaction zone, regenerating said contaminated catalyst by oxidatively removing said carbonaceous contaminants in a regeneration zone, recycling a major portion of hot regenerated cracking catalyst from said regeneration zone to said reaction zone, separating a minor portion of hot regenerated cracking catalyst from said regeneration zone and cooling said minor portion to a temperature of about 400° to 600° F., recycling said cooled portion to said catalyst impregnation zone, and impregnating said catalyst in said impregnation zone with said high-boiling liquid petroleum fraction as aforesaid.

2. A continuous process for the catalytic conversion of a high-boiling liquid petroleum fraction at an elevated pressure in the presence of hydrogen and a hydrogenation catalyst which comprises maintaining a fluidized bed of hydrogenation catalyst at a temperature, about 400° to 600° F., below that at which substantial vaporization and cracking of said high-boiling fraction occurs, in a catalyst impregnation zone, impregnating said hydrogenation catalyst at said temperature in said impregnation zone with said high-boiling liquid petroleum fraction while maintaining the catalyst in the fluidized state, withdrawing impregnated catalyst from said impregnation zone and transferring it to a reaction zone, catalytically converting under fluidizing conditions said high-boiling liquid petroleum fraction in said reaction zone at a temperature of about 750° to 950° F. in conjunction with a hydrogen-containing gas and simultaneously contaminating the fluidized hydrogenation catalyst in said reaction zone with carbonaceous contaminants, withdrawing catalytically converted products from said reaction zone, withdrawing carbonaceously contaminated hydrogenation catalyst from said reaction zone, regenerating said contaminated catalyst by oxidatively removing said carbonaceous contaminants, cooling said regenerated catalyst to a temperature of about 400° to 600° F., recycling said cooled regenerated catalyst to said catalyst impregnation zone, and impregnating said catalyst in said impregnation zone with said high-boiling liquid petroleum fraction as aforesaid.

3. The process of claim 2, wherein the catalytic conversion is a hydrocracking.

4. The process of claim 2, wherein said high-boiling liquid petroleum fraction contains sulfur and the catalytic conversion is a hydrodesulfurization.

5. A process for the catalytic conversion of a high-boiling liquid hydrocarbon fraction which comprises maintaining a fluidized bed of conversion catalyst in a catalyst impregnation zone at a temperature, about 400° to 600° F., below that at which substantial vaporization and cracking of said high-boiling fraction occurs, impregnating said catalyst at said temperature in said impregnation zone with said high-boiling fraction while maintaining the catalyst in the fluidized state, and then catalytically converting said impregnated high-boiling fraction at an elevated conversion temperature.

References Cited in the file of this patent

UNITED STATES PATENTS

| | | |
|---|---|---|
| 2,378,531 | Becker | June 19, 1945 |
| 2,382,755 | Tyson | Aug. 14, 1945 |
| 2,543,884 | Weikart | Mar. 6, 1951 |
| 2,556,514 | Bergstrom | June 12, 1951 |
| 2,614,066 | Cornell | Oct. 14, 1952 |